United States Patent
Moon et al.

(10) Patent No.: US 7,894,680 B2
(45) Date of Patent: Feb. 22, 2011

(54) IMAGE COMPRESSING METHOD

(75) Inventors: Joo Hee Moon, Seoul (KR); So Youn An, Bucheon-si (KR); Rizhu Jin, Seoul (KR); Hae Yean Moon, Seoul (KR)

(73) Assignee: Medison Co., Ltd., Hongchun-gun (JP)

( * ) Notice: Subject to any disclaimer, the term of this patent is extended or adjusted under 35 U.S.C. 154(b) by 937 days.

(21) Appl. No.: 11/755,476

(22) Filed: May 30, 2007

(65) Prior Publication Data

US 2007/0280542 A1    Dec. 6, 2007

(30) Foreign Application Priority Data

May 30, 2006    (KR)  ............ 10-2006-0048847

(51) Int. Cl.
*G06K 9/36*    (2006.01)

(52) U.S. Cl. ............... 382/232; 382/233; 382/236; 382/239

(58) Field of Classification Search .......... 382/232, 382/233, 236, 239, 250; 341/51, 61; 375/240.03, 375/240.06, E7.14; 704/223, 219
See application file for complete search history.

(56) References Cited

U.S. PATENT DOCUMENTS

| | | | | |
|---|---|---|---|---|
| 4,302,775 A | * | 11/1981 | Widergren et al. | 375/240.06 |
| 4,394,774 A | * | 7/1983 | Widergren et al. | 382/250 |
| 5,592,225 A | * | 1/1997 | Kurobe | 375/240.03 |
| 6,067,118 A | * | 5/2000 | Chen et al. | 375/240.03 |
| 7,574,354 B2 | * | 8/2009 | Lamblin et al. | 704/223 |

OTHER PUBLICATIONS

Y.M. Yeung, et al., "Efficient Rate Control for JPEG2000 Image Coding", IEEE Transactions on Circuits and Systems for Video Technology, vol. 15, No. 3, Mar. 3, 2005, pp. 335-344.

* cited by examiner

*Primary Examiner*—Anh Hong Do
(74) *Attorney, Agent, or Firm*—Oblon, Spivak, McClelland, Maier & Neustadt, L.L.P.

(57) ABSTRACT

There is provided an image compressing method, which comprises: partitioning a frame into a plurality of code blocks, each code block having consecutive coding passes; sequentially coding the code passes at each code block, wherein said coding at said each code block comprises: a) coding a first coding pass to produce code bits; b) calculating a rate of the code bits and a distortion; c) calculating a slope of the rate and the distortion; d) checking whether the calculated slope is smaller than a predetermined reference value; and e) if it is determined that the calculated slope is not smaller than the predetermined reference value, then coding the next coding pass and repeating step b) to step e).

8 Claims, 8 Drawing Sheets

IMAGE COMPRESSING METHOD

The present application claims priority from Korean Patent Application No. 10-2006-0048847 filed on May 30, 2006, the entire subject matter of which is incorporated herein by reference.

BACKGROUND

1. Field

The present invention generally relates to an image processing method, and more particularly to a method of compressing an image by using embedded block coding with optimized truncation (EBCOT).

2. Background

The Joint Photographic Expert Group (JPEG) 2000 is known as a standard compressing method, which uses embedded block coding with optimized truncation (EBCOT). The JPEG2000 is used for compressing a still image, a moving image and a medical image. Compared to previous image compression standards, the compression capability of JPEG2000 is enhanced. However, the JPEG2000 requires a relatively large amount of calculations since it involves a complex compression technique. Especially, the JPEG2000 adopts EBCOT, which involves an arithmetic coding method of high performance. This obviously makes its implementation very complex. The time required for the arithmetic coding occupies about 45%~60% of the entire coding time for image compression. As such, there is a problem in that the compression time is undesirably increased.

BRIEF DESCRIPTION OF THE DRAWINGS

Arrangements and embodiments may be described in detail with reference to the following drawings in which like reference numerals refer to like elements and wherein.

DETAILED DESCRIPTION OF THE PRESENT INVENTION

An image compressing method using embedded block coding with optimized truncation (EBCOT) will be described below in detail with reference to the accompanying drawings.

Figure 1:
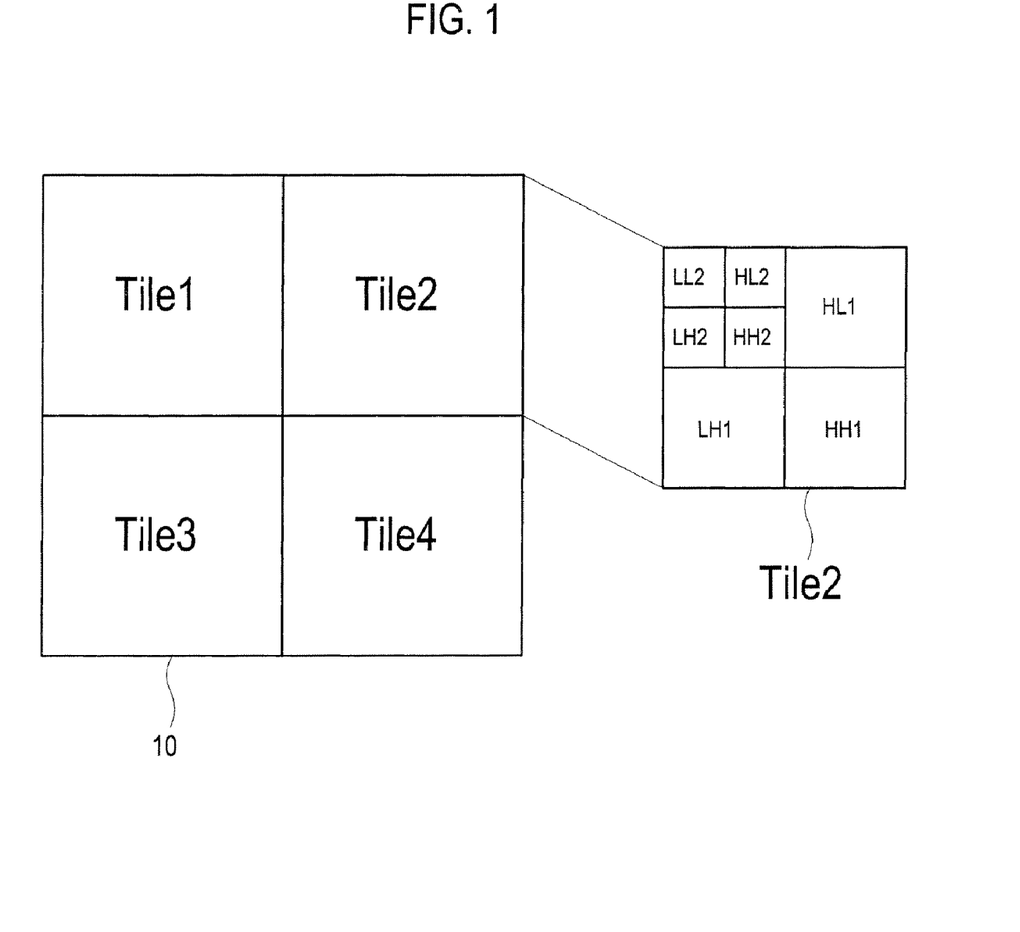
FIG. 1 is a schematic diagram showing a wavelet transformation process.

As illustrated in FIG. 1, an original image (or frame) constructed with a plurality of pixels is cut into a plurality of tiles, i.e., Tile 1, Tile 2, Tile 3 and Tile 4 (tiling), which do not overlap each other. Each tile has a plurality of tile pixels. Discrete wavelet transformation (DWT) is applied on each tile to decompose each tile into a plurality of sub-bands, i.e., LL1, HL1, HH1, HL2, LH2 and HH2. A first alphabet in symbols representing the sub-bands means a filter type applied to the image in a horizontal direction, whereas a second alphabet means a filter type applied to the image in a vertical direction. Further, a numeral reference in the symbols means a decomposed level, i.e., an order of DWT. The order of DWT may vary according to the predetermined setup.

Figure 2:
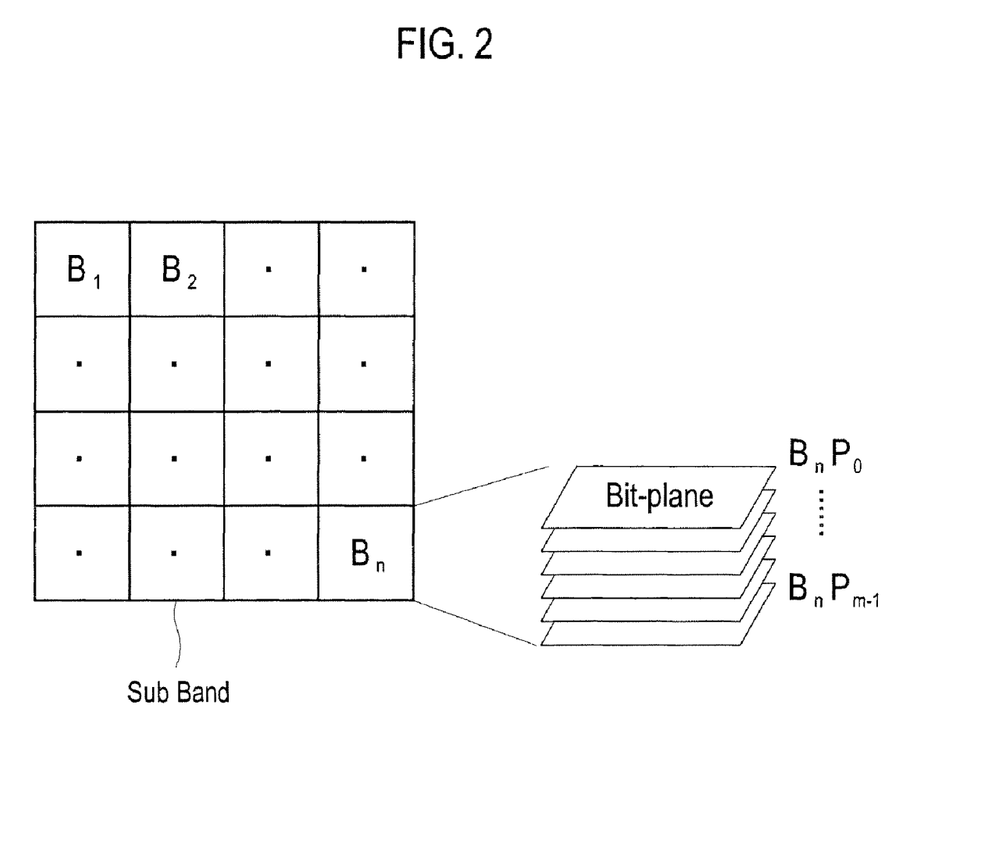
FIG. 2 is a schematic diagram showing sub-bands partitioned from a code block.

As shown in FIG. 2, one of the sub-bands is partitioned into a plurality of code blocks, i.e., $B_0$-$B_n$. It is preferable to partition a LL sub-band in accordance with the present invention. Pixel values (wavelet coefficients) included in each code block are quantized to enhance compression performance. The quantized pixel values x(n) are separated into a sign bit z(n) and m bit data $a_{m-1}, a_{m-2}, \ldots, a_1, a_0$. The sign bit z(n) and m bit data $a_{m-1}, a_{m-2}, \ldots, a_1, a_0$ can be defined as equations (1) and (2), which are shown below:

$$z(n) = \begin{cases} 0 & \text{if } x(n) \geq 0 \\ 1 & \text{if } x(n) < 0 \end{cases} \quad (1)$$

$$|x(n)| = a_{m-1}2^{m-1} + a_{m-2}2^{m-2} + \ldots + a_1 2^1 + a_0 2^0 \quad (2)$$

wherein bit data $a_{m-1}$ in equation (2) represents a coefficient of an m−1 bit plane.

As shown in equation (2), the quantized pixel values included in each code block are decomposed into bit data. Then, a coefficient bit is obtained by summing the bit data corresponding to an identical bit order. Thereafter, each code block is decomposed into m bit planes. The bit plane is a set of pixel values having bit data corresponding to an identical bit order of the quantized pixel values of each code block. For example, a bit plane $B_n P_{m-2}$ among bit planes $B_n P_0$-$B_n P_{m-2}$, which are obtained by decomposing a code block $B_n$, is a set of pixels having $a_{m-2}$ bit data.

Figure 3:
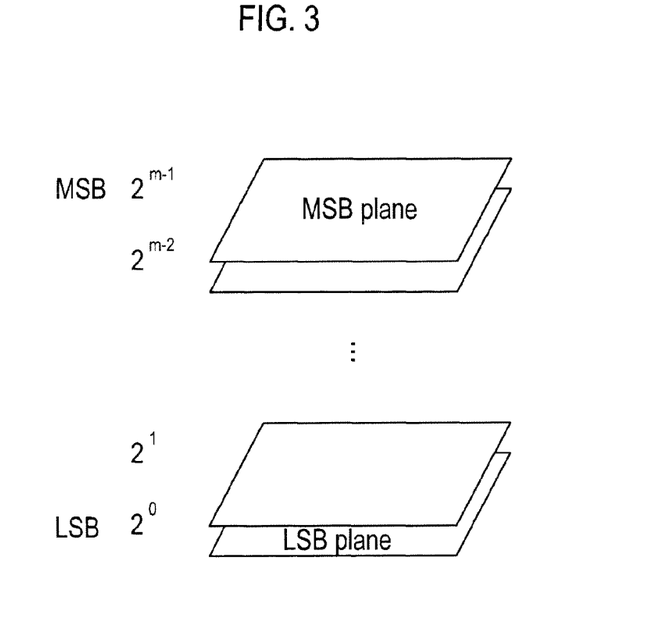
FIG. 3 is a schematic diagram showing a relationship between a code block and bit planes.
Figure 4:
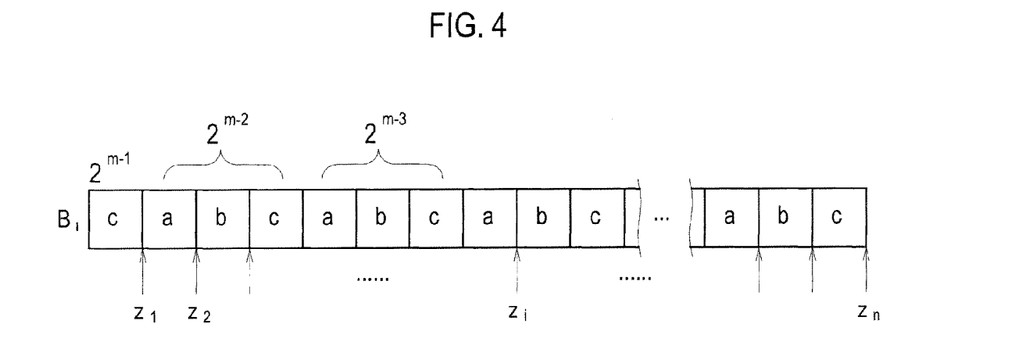
FIG. 4 is a schematic diagram showing a relationship between a bit plane, coding passes and a truncation point.

FIG. 3 is a schematic diagram showing bit planes from the most significant bit (MSB) plane to the least significant bit (LSB) plane. FIG. 4 is a schematic diagram showing a relationship between coding passes, bit planes and truncation points. As shown in FIG. 4, all of the bit planes (except the MSB plane) are coded by one of the consecutive coding passes, i.e., a, b and c. In this case, a, b and c represent a significant propagation pass, a magnitude refinement pass and a clean-up pass, respectively. Bit data at the end of the $n_i^{th}$ coding pass may be a candidate for the truncation point $Z_i$, wherein i is a natural number. Coding passes, which lie on the next truncation point, are excluded from the coding process.

The truncation point $Z_i$ is determined according to the rate of code bits R and distortion D. When a pixel value of an arbitrary pixel included in the coding block $B_i$ is $S_k[k]$ and a pixel value of the corresponding pixel included in the coding block $B_i$, which is reconstructed by coding up to a $n_i^{th}$ coding pass, is $\hat{S}_k^{n_i}[k]$, distortion $D_i^{n_i}$ up to the $n_i^{th}$ coding pass in a $i^{th}$ code block $B_i$ can be defined as the following equation (3). The distortion $D_i^{n_i}$ is measured by using a weight with mean square error (MSE).

$$D_i^{n_i} = W_b^2 \sum_{k \in B_i} \left(\hat{S}_k^{n_i}[k] - S_k[k]\right)^2 \quad (3)$$

wherein $W_b^2$ represents the weight of the basis vectors for the $i^{th}$ code block $B_i$. A total distortion D of the code bits can be defined as the following equation (4)

$$D = \sum_i D_i^{n_i} \qquad (4)$$

A bit allocation optimization process is directed to finding a truncation point from each code block, which can minimize the distortion D of a reconstructed image. If a bit rate up to the $n_i^{th}$ coding pass in an $i^{th}$ code block $B_i$ is denoted by $R_i^{n_i}$, then the total rate of code bits R is defined as the following equation (5).

$$R = \sum_i R_i^{n_i} \qquad (5)$$

The distortion D cannot be reduced without increasing the rate of code bits R. That is, if the rate of code bits R is increased, then the distortion D of the image is also increased. Therefore, the distortion must be reduced, while the rate of code bits R is equal to a target bit rate $R_{target}$, which is previously set. This problem may be mapped into the Lagrange optimization problem as a minimization of the following equation (6). As the Lagrange multiplier λ is found, a set of coding passes $N_i = \{n_i(\lambda)\}_{i=1, 2 \ldots}$, which meets $R = R_{target}$ and minimizes the distortion D, can be obtained.

$$J = D + \lambda R = \sum_i \left( D_i^{n_i(\lambda)} + \lambda R_i^{n_i(\lambda)} \right) \qquad (6)$$

An R-D slope $S_i^{n_i}$ for an $i^{th}$ code block $B^i$ at the $n_i^{th}$ coding pass is defined as the following equation (7)

$$S_i^{n_i} = \frac{\Delta D_i^{n_i}}{\Delta R_i^{n_i}} = \frac{D_i^{n_i-1} - D_i^{n_i}}{R_i^{n_i} - R_i^{n_i-1}} \qquad (7)$$

An optimal truncation point $Z_i(\lambda_{optimal})$ can be determined from $N_i$ of the code block $B_i$ with reference to an optimal Lagrange multiplier $\lambda_{optimal}$ as the following equation (8).

$$Z_i(\lambda_{optimal}) = \max\{j \in N_i | S_i^j \geq \lambda_{optimal}\} \qquad (8)$$

If the truncation point $Z_i(\lambda_{optimal})$ is determined under the condition of $S_i^{n_i+1} < S_i^{n_i}$, then the truncation point $Z_i$ at the optimal Lagrange multiplier $\lambda_{optimal}$ is equal to the maximum value of j, which satisfies the equation (8). In order to find the optimal Lagrange multiplier $\lambda_{optimal}$ and the truncation point $Z_i(\lambda_{optimal})$, the post compression rate-distortion optimization can be employed.

An image compression method will be described below in detail in accordance with the present invention.

First Embodiment

Figure 5A:
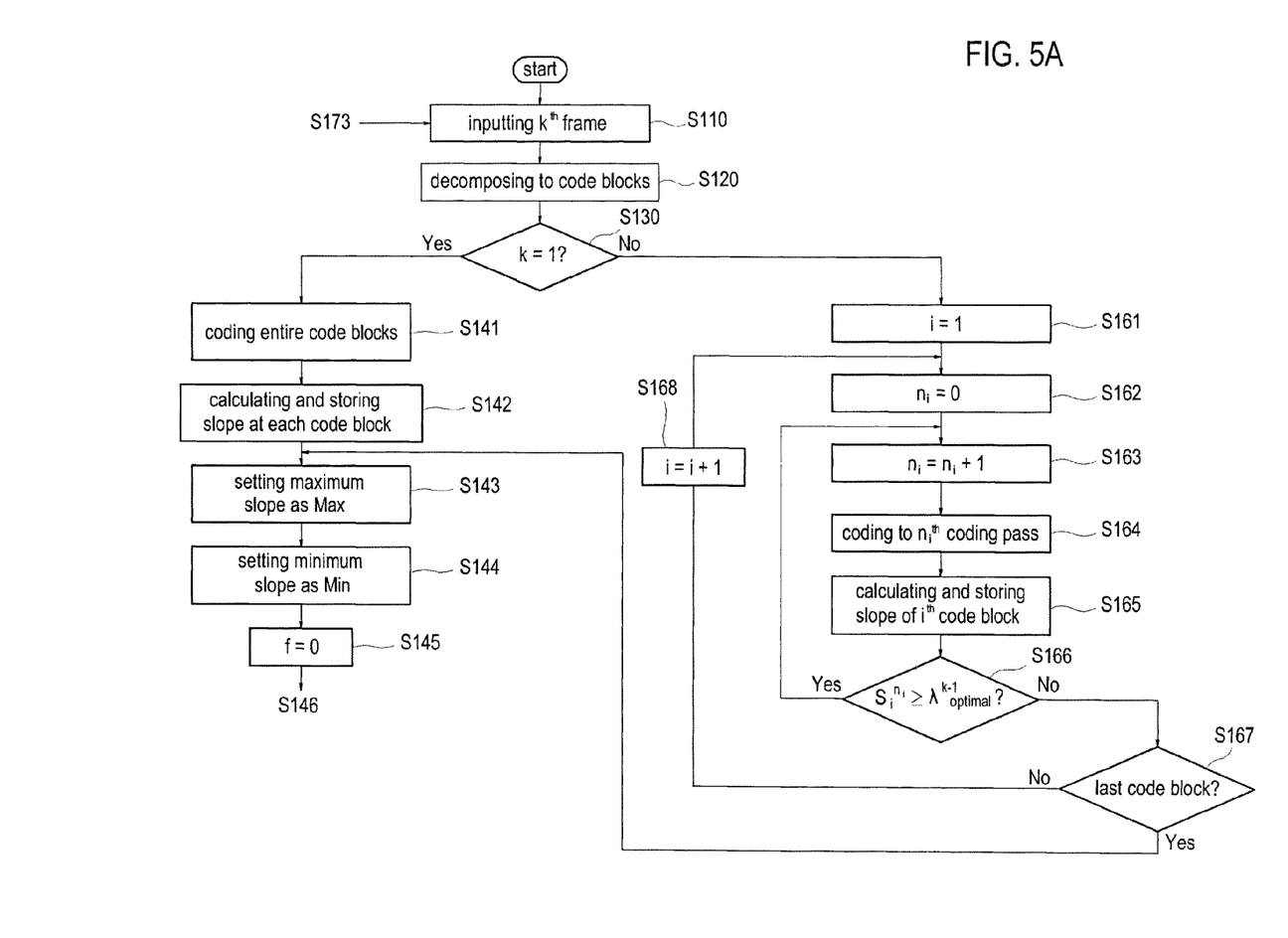
FIGS. 5A and 5B are flowcharts illustrating a method of compressing an image in accordance with a first embodiment of the present invention.
Figure 5B:
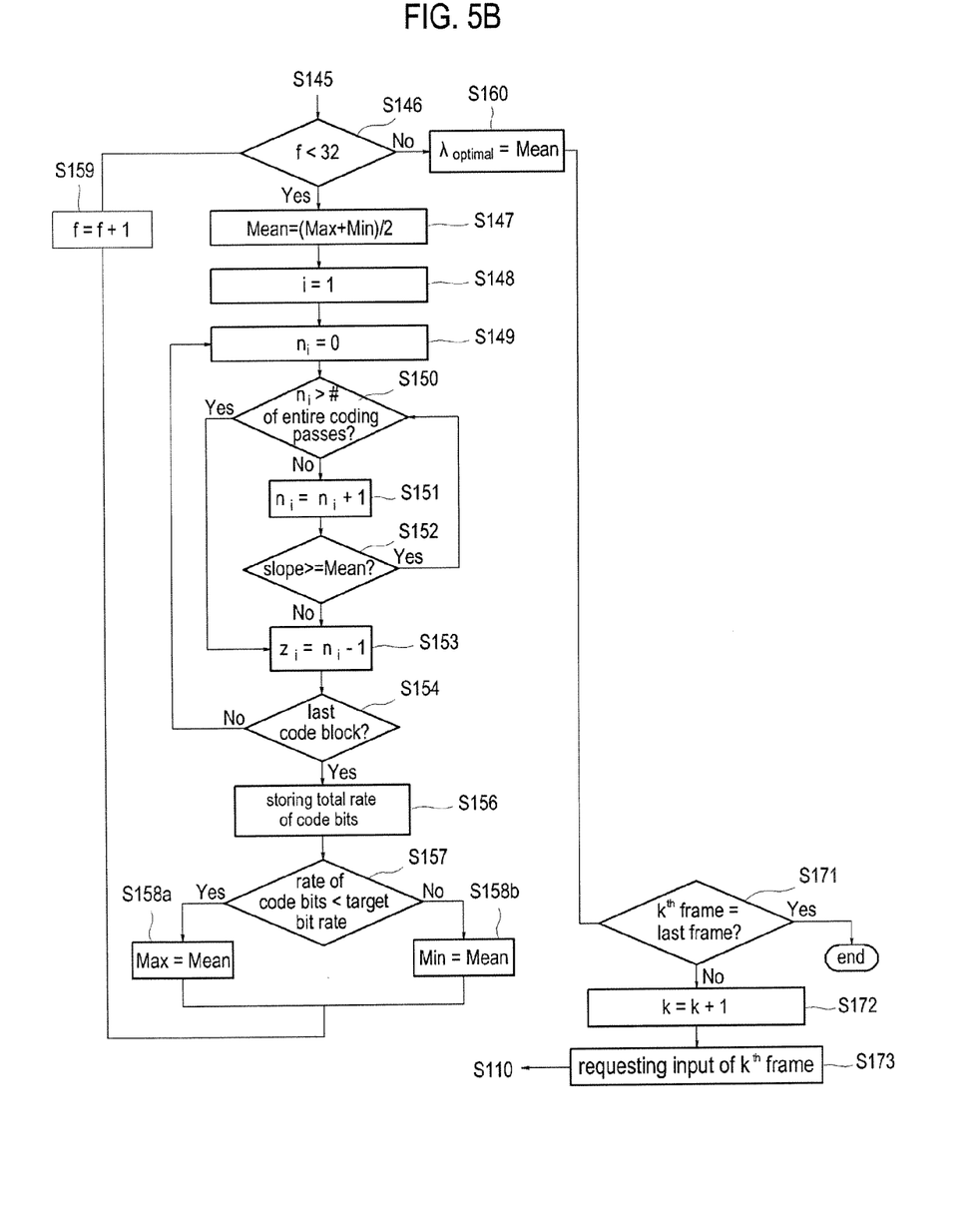

As shown in FIGS. 5A and 5B, a current frame ($k^{th}$ frame, wherein k is a positive integer) is inputted from a plurality of consecutive frames at step S110. The $k^{th}$ frame is decomposed into a plurality of different sub-bands. Then each sub-band is divided into a plurality of code blocks, the orders of which are designated at step S120. As described above, each code block is separated into bit planes, each being configured to have a plurality of coding passes.

It is checked whether the input frame is a first frame at step S130. If it is determined that the input frame is the first frame, then the entire bit planes from an MSB plane to an LSB plane are coded at step S141. Thereafter, R-D slopes $S_i^{n_i}$ at each coding pass of the entire code blocks are calculated according to the equation (7), wherein the calculated R-D slopes $S_i^{n_i}$ are stored at step S142. A maximum R-D slope $S_{max}$ and a minimum R-D slope $S_{min}$ among the calculated R-D slopes $S_i^{n_i}$ are stored as Max and Min, respectively, at steps S143 and S144. In order to determine a reference Lagrange multiplier $\lambda_{optimal}^k$ at the $k^{th}$ frame, a variable f is first set as f=0 at step S145. Then, it is checked whether the variable f is smaller than a predetermined number, e.g. 32, at step S146. If the variable f is smaller than the predetermined number, then a mean R-D slope $S_{mean}$ of the maximum R-D slope $S_{max}$ and the minimum R-D slope $S_{min}$ is calculated at step S147.

Coding passes having R-D slopes $S_i^{n_i}$, which are greater than mean R-D slope $S_{mean}$, are searched at each code block. Then, the bit data at the end of a coding pass having a maximum R-D slope $S_i^{n_i}$ among the searched coding passes is set as a truncation point through steps S148 to S154. i denoting an order of the code block is initialized as i=1 at step S148 and $n_i$ denoting an order of the coding pass is initialized as $n_i=0$ at step S149. If $n_i$ is greater than or equal to a total number of the coding passes in the corresponding code block $B_i$, then the truncation point $Z_i$ is determined such as $Z_i = n_i - 1$ at step S153. On the other hand, if $n_i$ is smaller than the total number of the coding passes in the corresponding code block $B_i$, then the order of coding pass is set such as $n_i = n_i + 1$ at step S151. Thereafter, it is checked whether the R-D slope $S_i^{n_i}$ at the $n_i$ coding pass of the $i^{th}$ code block $B_i$ is greater than or equal to the mean R-D slope $S_{mean}$ at step S152. If the R-D slope $S_i^{n_i}$ is smaller than the mean R-D slope $S_{mean}$, then the truncation point $Z_i$ is determined as $Z_i = n_i - 1$ at step S153. If the R-D slope $S_i^{n_i}$ is greater than or equal to the mean R-D slope $S_{mean}$, then the process goes back to step S150.

After determining the truncation point, it is checked whether the $i^{th}$ code block $B_i$ corresponds to the last code block at step S154. If it is determined that the $i^{th}$ code block $B_i$ is not the last code block, then i is set as i=i+1 at step S155 and the process then goes to step S149. On the other hand, if it is determined that the $i^{th}$ code block $B_i$ is the last code block, then a bit stream, which obtained by coding bit data of the entire code blocks up to the truncation points thereof, is packetized. Then, the rate of the packetized bits, i.e., the rate of code bits R, is stored at step S156. Next, the rate of code bits R of the frame is compared with the target bit rate $R_{target}$ at step S157. If R is smaller than $R_{target}$, then Max is replaced with Mean at step S158a. On the contrary, if R is greater than $R_{target}$, then the Min is replaced with Mean at step S158b. Steps S143 to S158a or S158b are repeatedly carried out as many as predetermined times, e.g., 32 times to update Max and Min by increasing the variable f by one at step S159. This is so that Mean, which is finally set, is determined as the reference Lagrange multiplier $\lambda_{optimal}^k$ of the corresponding frame at step S160.

Subsequently, it is checked whether the current frame is the last frame at step S171. If the current frame is the last frame, then the process is completed. On the other hand, if the current frame is not the last frame, then k is set as k=k+1 at step S172. Then, an input of a $k^{th}$ frame is requested at step S173 and the process goes back to step S110.

If it is determined that the inputted frame is not the first frame at step S130, then the order of code blocks i is initialized as i=1 at step S161 and the order of the coding pass $n_i$ is initialized as $n_i$=0 at step S162. Thereafter, the order of the coding pass $n_i$ is set as $n_i$=$n_i$+1 at step S163 and the bit data of the $n_i^{th}$ coding pass in the $i^{th}$ code block $B_i$ are coded at step S164. Then, $S_i^{n_i}$ at each code pass is calculated and stored at step S165. It is checked whether the calculated $S_i^{n_i}$ is greater than or equal to the reference Lagrange multiplier $\lambda_{optimal}^{k-1}$ at step S166. If $S_i^{n_i}$ is greater than or equal to $\lambda_{optimal}^k$ then the process goes to step S163. If not, then it is checked whether the $i^{th}$ code block corresponds to the last code block at step S167. If the $i^{th}$ code block $B_i$ is not the last code block, then i is set as i=i+1 at step S168 and the process goes to step S162.

As mentioned above, after the second frame, the slopes of the coding passes are calculated until $S_i^{n_i}$ becomes smaller than $\lambda_{optimal}^k$, which is determined at a previous frame. That is, the entire R-D slopes $S_i^{n_i}$ of each coding pass of the entire bit planes are not calculated. Therefore, the number of coding passes, which are to be arithmetically coded, can be reduced so that the time for compressing the image can be reduced.

Second Embodiment

Figure 6:
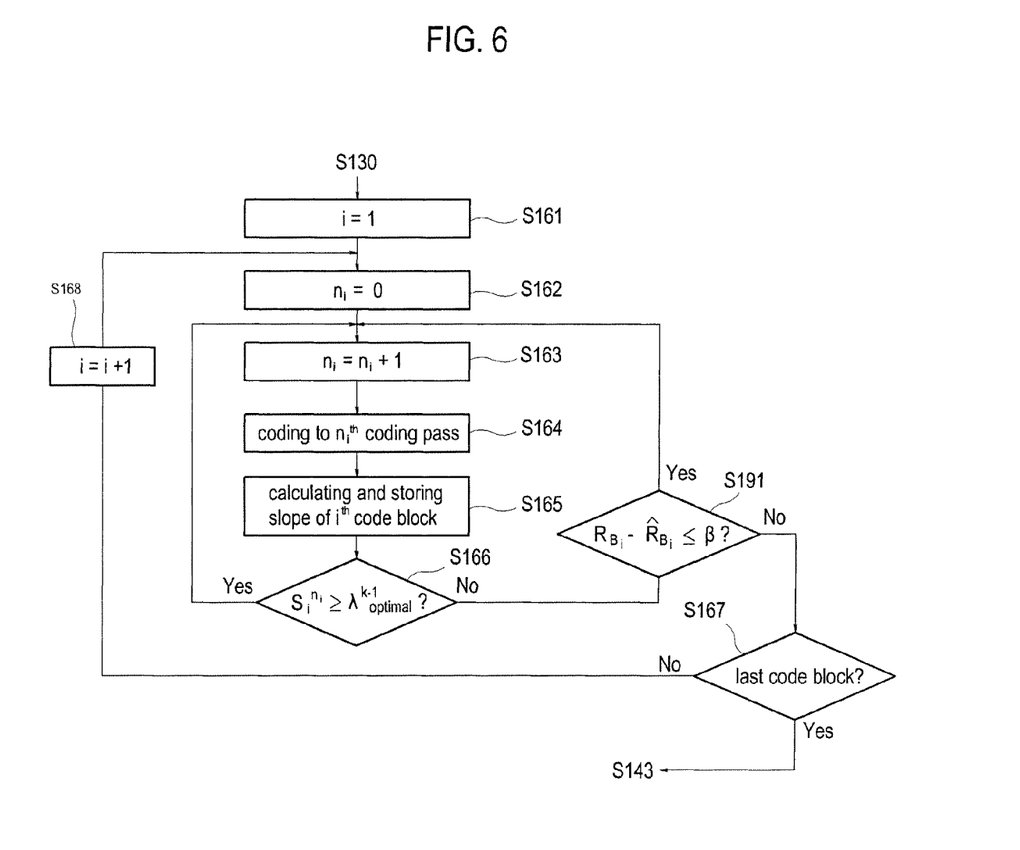
FIG. 6 is a flowchart illustrating a method of compressing an image in accordance with a second embodiment of the present invention.

However, since the assumption that the truncation point is determined at a condition of $S_i^{n_i+1} < S_i^{n_i}$ may be not always correct, a peak signal-to-noise ratio (PSNR) may be decreased. Therefore, a second embodiment of the present invention will be described with reference to FIG. 6 for complementing the above problem. In accordance with the second embodiment of the present invention, the truncation point may be determined by comparing the number of coding passes, which are not coded, of a current frame and a previous frame. For example, if it is determined that $S_i^{n_i}$ is smaller than $\lambda_{optimal}^{k-1}$ at step S166, then a bit rate $R_{B_i}$ of the coding passes, which are not coded in the $i^{th}$ code block $B_i$ of a previous frame, is compared with a bit rate $\hat{R}_{B_i}$ of coding passes that are not coded in the $i^{th}$ code block $B_i$ of a current frame at step S111. If $R_{B_i} - \hat{R}_{B_i}$ is smaller than or equal to an allowable value β (β≦0) for terminating the coding pass, then the process goes to step S163. Then, the order of the coding pass $n_i$ is increased by one. Even if the second embodiment of the present invention may increase the compression time compared to the first embodiment of the present invention, the PCRD may be maintained similar to the conventional PCRD.

Third Embodiment

In the first embodiment of the present invention, the truncation point may be determined by comparing the target bit rate with the code bit rate. Hereinafter, the third embodiment of the present invention for determining the truncation point by comparing the target bit rate with the code bit rate will be described in detail with reference to FIG. 7.

Figure 7:
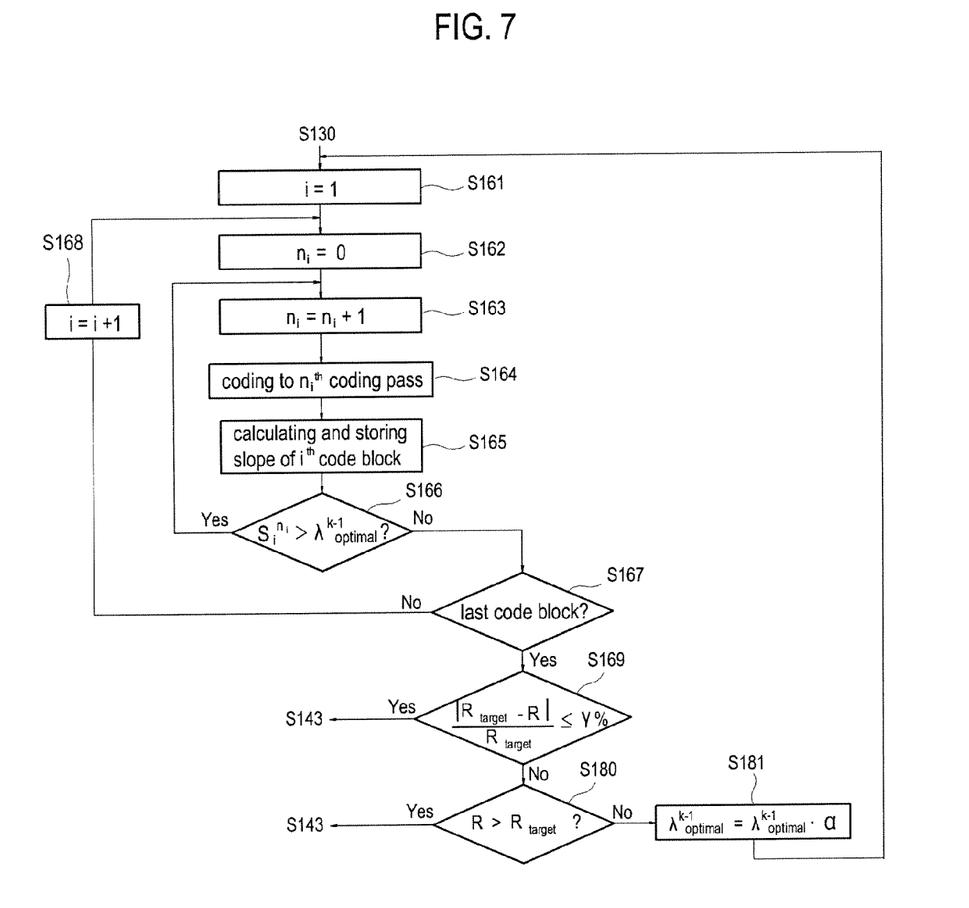
FIG. 7 is a flowchart illustrating a method of compressing an image in accordance with a third embodiment of the present invention.

If the $i^{th}$ code block $B_i$ is the last code block at step S167, then it is checked whether an absolute value of a difference between the total rate of code bits R and the target bit rate is smaller than or equal to r % of the target bits according to the following equation (9) at step S169.

$$\frac{|R_{target} - R|}{R_{target}} \leq r\% \qquad (9)$$

When the truncation point $Z_i$ is determined by using the PCRD optimization, the rate of code bits R cannot be equal to the target bit rate $R_{target}$, with the result being that an error of r % in the reconstructed image may be ignored. The error may be 3% in accordance with one embodiment of the present invention.

If it is determined that the difference between the rate of code bits R and the target bit rate $R_{target}$ is smaller than or equal to r %, then the steps next to step S143 are carried out. On the other hand, if it is determined that the difference between the rate of code bits R and the target bit rate $R_{target}$ is greater than r % at step S169, then it is checked whether the rate of code bits R of the $i^{th}$ code block $B_i$ is greater than the target bit rate $R_{target}$ at step S170. If $R < R_{target}$, i.e., the coding is not carried out up to the target bit rate $R_{target}$, then the reference value $\lambda_{optimal}^{k-1}$ is decreased at step S181. In such a case, the reference value $\lambda_{optimal}^{k-1}$ may be decreased by multiplying α, which is smaller than 1, and then the process goes back to step S161. If it is determined that $R < R_{budget}$ at step S170, then the processes after step S143 are carried out.

Fourth Embodiment

The truncation point may be determined by comparing the number of entire bits of coding passes, which are not coded in the current frame and the previous frame, in the third embodiment. Hereinafter, the fourth embodiment of the present invention will be described with reference to FIG. 8.

Figure 8:
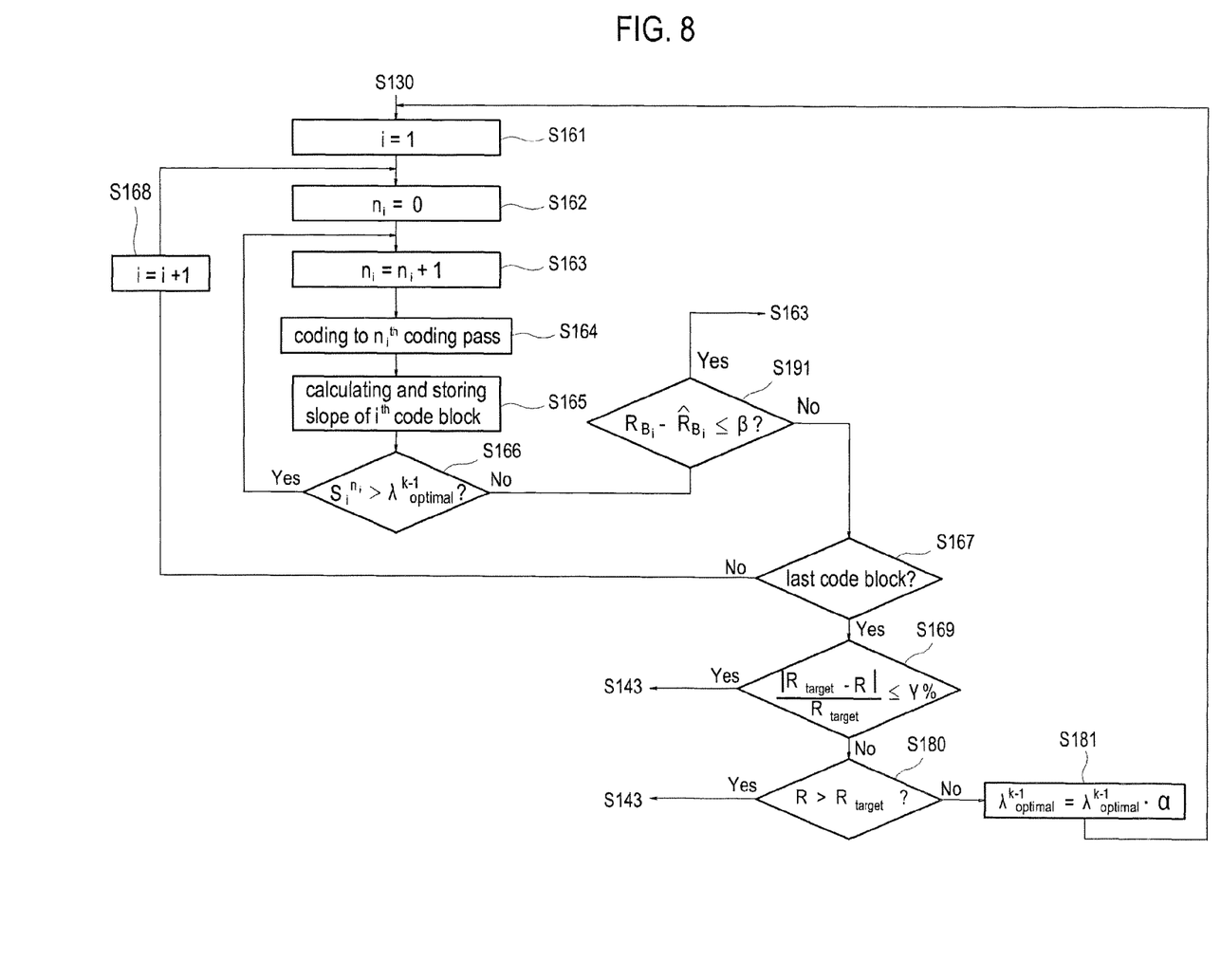
FIG. 8 is a flowchart illustrating a method of compressing an image in accordance with a fourth embodiment of the present invention.

If it is determined that $S_i^{n_i}$ is smaller than $\lambda_{optimal}^{k-1}$ at step S166, then a rate of code bits $R_{B_i}$ of the coding passes, which are not coded in the $i^{th}$ code block $B_i$ of a previous frame, is compared with a rate of code bits $\hat{R}_{B_i}$ of the coding passes that are not coded in the $i^{th}$ code block $B_i$ of a current frame at step S191. If $R_{B_i} - \hat{R}_{B_i}$ is smaller than or equal to an allowable value β (β≦0) for terminating the pass, then the process goes to step S163 and then the order of the coding pass is increased by one. On the other hand, if $R_{B_i} - \hat{R}_{B_i}$ is greater than the allowable value β, then the processes after S167 are carried out.

In accordance with the fourth embodiment of the present invention, since the truncation point is determined by comparing not only the code bit rate and the target bit rate but also the code bit rate of coding passes of the current frame and the previous frame, image compression can be rapidly carried out. Further, the degradation of an image can be efficiently prevented.

As mentioned above, since the number of coding passes from a second frame, which need the arithmetic coding, is reduced in accordance with the present invention, the coding process can be efficiently performed. Accordingly, when the number of target bits is relatively small, the coding time for image compression can be considerably reduced.

In accordance with one embodiment of the present invention, an image compressing method, comprises: partitioning a frame into a plurality of code blocks, each code block having consecutive coding passes; sequentially coding the code passes at each code block, wherein said coding at said each code block comprises: a) coding a first coding pass to produce code bits; b) calculating a rate of the code bits and a distortion; c) calculating a slope of the rate and the distortion; d) checking whether the calculated slope is smaller than a predetermined reference value; and e) if it is determined that the calculated slope is not smaller than the predetermined reference value, then coding the next coding pass and repeating step b) to step e).

In accordance with another embodiment of the present invention, an image compressing method, comprises: a) partitioning a $k^{th}$ frame among a plurality of consecutive frames into a plurality of code blocks, each code block being configured to have a plurality of consecutive coding passes and k is a positive integer greater than 1; b) sequentially coding the coding passes at each code block to calculate and store slopes of a rate of code bits and a distortion, wherein an order of the coding pass is increased by one until the calculated slope becomes smaller than a predetermined reference value of a $(k-1)^{th}$ frame; c) storing a maximum slope and a minimum slope among the calculated slopes at each coding pass; d) calculating a mean slope of the maximum slope and the minimum slope; e) comparing a slope at each coding pass with the mean slope by sequentially increasing the order of the coding pass until the slope becomes greater than or equal to the mean slope; f) when the slope becomes greater than or equal to the mean slope, determining a truncation point with reference to an order of the corresponding coding pass; g) coding entire code block up to the truncation point and storing a rate of code bits; h) if the rate of code bits is smaller than a target bit rate, then updating the maximum slope with the mean slope, and if the rate of code bits is greater than the target bit rate, then updating the minimum slope with the mean slope; and i) repeatedly performing the steps d) to h) to update the mean slope and storing the updated mean slope as a reference value of the $k^{th}$ frame.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of compressing an image using an image processing device having a processor, the method comprising:
 partitioning, using the processor, a frame into a plurality of code blocks, each code block having consecutive coding passes; and
 sequentially coding, using the processor, the code passes at each code block, wherein said coding at said each code block includes
 a) coding a first coding pass to produce code bits,
 b) calculating a rate of the code bits and a distortion,
 c) calculating a slope of the rate and the distortion,
 d) checking whether the calculated slope is smaller than a predetermined reference value, and
 e) if it is determined that the calculated slope is not smaller than the predetermined reference value, then coding the next coding pass and repeating step b) to step e).

2. A method of compressing an image using an image processing device having a processor, the method comprising:
 a) partitioning, using the processor, a $k^{th}$ frame among a plurality of consecutive frames into a plurality of code blocks, each code block being configured to have a plurality of consecutive coding passes and k is a positive integer greater than 1;
 b) sequentially coding, using the processor, the coding passes at each code block to produce code bits and calculate a rate of code bits and a distortion and a slope of the rate and the distortion, wherein an order of the coding pass is increased by one to code a next coding pass until the calculated slope becomes smaller than a predetermined reference value of a $(k-1)^{th}$ frame;
 c) storing a maximum slope and a minimum slope among the calculated slopes at each coding pass;
 d) calculating a mean slope of the maximum slope and the minimum slope;
 e) comparing a slope at each coding pass with the mean slope by sequentially increasing the order of the coding pass until the slope becomes greater than or equal to the mean slope;
 f) when the slope becomes greater than or equal to the mean slope, determining a truncation point with reference to an order of the corresponding coding pass;
 g) coding entire code blocks up to the truncation point and storing a total rate of code bits;
 h) if the total rate of code bits is smaller than a target bit rate, then updating the maximum slope with the mean slope, and if the total rate of code bits is greater than the target bit rate, then updating the minimum slope with the mean slope; and
 i) repeatedly performing the steps d) to h) to update the mean slope and storing the updated mean slope as a reference value of the $k^{th}$ frame.

3. The method of claim 2, wherein the step a) includes:
 a1) performing wavelet transformation to decompose the $k^{th}$ frame into a plurality of sub-bands; and
 a2) partitioning one of the sub-bands into a plurality of code blocks.

4. The method of claim 2, wherein an end of coding pass prior to a coding pass whose slope is greater than or equal to the mean slope is determined as the truncation point.

5. The method of claim 2, before the step a), further comprising:
 p1) partitioning a first frame among the plurality of consecutive frames into a plurality of code blocks, each code block being configured to have a plurality of consecutive coding passes;
 p2) sequentially coding each code block of the first frame;
 p3) calculating and storing a slope of a rate of code bits and a distortion; and
 p4), after the step p3), performing the steps next to step c).

6. The method of claim 5, wherein the step b) includes:
 when the slope at each code block is smaller than a reference value of a $(k-1)^{th}$ frame, calculating first and second bit rates of coding passes, which are not coded at corresponding code blocks of the $(k-1)^{th}$ frame and the $k^{th}$ frame; and
 if a difference between the first and second bit rates is smaller than or equal to an allowable value for ending a corresponding coding pass, then increasing an order of the coding pass and performing the steps next to the step b).

7. The method of claim 5, wherein the step b) further includes:
 checking whether a difference between a total rate of code bits at each code block and the target bit rate is greater than a reference ratio;
 if the difference is smaller than the reference ratio, then performing the step c) and, if the difference is greater than the reference ratio, then checking whether the total rate of code bits is greater than the target bit rate; and if the total rate of code bits is greater than the target bit rate, then performing the step c) and, if the total rate of code bits is smaller than the target bit rate, then decreasing the reference value of the $(k-1)^{th}$ frame and performing the steps next to the step b).

8. The method of claim 7, wherein the step b) further includes:

when the slope at each code block is smaller than the reference value of the $(k-1)^{th}$ frame, calculating a first bit rate of coding passes and a second bit rate of coding passes, which are not coded at corresponding code blocks of the $k^{th}$ and $(k-1)^{th}$ frames; and if a difference between the first bit rate and the second bit rate is smaller than or equal to an allowable value for ending the corresponding coding pass, then increasing an order of the coding pass and performing the steps next to the step b).

* * * * *

UNITED STATES PATENT AND TRADEMARK OFFICE
CERTIFICATE OF CORRECTION

| | | |
|---|---|---|
| PATENT NO. | : 7,894,680 B2 | Page 1 of 1 |
| APPLICATION NO. | : 11/755476 | |
| DATED | : February 22, 2011 | |
| INVENTOR(S) | : Joo Hee Moon et al. | |

It is certified that error appears in the above-identified patent and that said Letters Patent is hereby corrected as shown below:

On the title page, Item (73), the Assignee information is incorrect. Item (73) should read:

-- (73) Assignee: Medison Co., Ltd., Hongchun-gun (KR) --

Signed and Sealed this
Tenth Day of May, 2011

David J. Kappos
*Director of the United States Patent and Trademark Office*